United States Patent [19]

Elliott et al.

[11] 4,194,984

[45] Mar. 25, 1980

[54] ETHYLENE COPOLYMER/ETHYLENICALLY UNSATURATED NITROGEN REACTANT ENE ADDUCTS HAVING UTILITY AS MULTIFUNCTIONAL V. I. IMPROVERS FOR LUBRICATING OILS

[75] Inventors: Robert L. Elliott, Scotch Plains; Won R. Song, Maplewood, both of N.J.

[73] Assignee: Exxon Research & Engineering Co., Florham Park, N.J.

[21] Appl. No.: 934,362

[22] Filed: Aug. 17, 1978

Related U.S. Application Data

[63] Continuation of Ser. No. 748,954, Dec. 9, 1976, abandoned, which is a continuation-in-part of Ser. No. 668,610, Mar. 19, 1976, abandoned.

[51] Int. Cl.$^2$ ............... C10M 1/28; C08L 77/08
[52] U.S. Cl. .................. 252/51.5 A; 252/50; 252/51.5 R
[58] Field of Search ............ 252/50, 51.5 R, 51.5 A; 260/878 R

[56] References Cited

U.S. PATENT DOCUMENTS

| 3,326,804 | 6/1967 | Hu | 252/34 |
|---|---|---|---|
| 3,378,492 | 4/1968 | Song et al. | 252/50 X |
| 3,404,091 | 10/1968 | Takeshima et al. | 252/50 |
| 3,445,387 | 5/1969 | Liston | 252/50 X |
| 3,842,010 | 10/1974 | Pappas et al. | 252/51.5 R |
| 4,051,048 | 9/1977 | Elliott et al. | 252/51.5 R |
| 4,051,050 | 9/1977 | Elliott et al. | 252/51.5 A X |
| 4,068,057 | 1/1978 | Engel et al. | 252/50 X |
| 4,092,255 | 5/1978 | Chapelet et al. | 252/51.5 A X |
| 4,098,710 | 7/1978 | Elliott et al. | 252/51.5 R X |
| 4,113,636 | 9/1978 | Engel et al. | 252/51.5 R |

FOREIGN PATENT DOCUMENTS

| 607362 | 10/1960 | Canada | 252/51.5 R |
|---|---|---|---|
| 787055 | 11/1957 | United Kingdom | 252/50 |
| 1074948 | 7/1967 | United Kingdom | 252/51.5 R |

Primary Examiner—Thomas A. Waltz
Attorney, Agent, or Firm—Roland A. Dexter; Frank T. Johmann

[57] ABSTRACT

An ene adduct and adduct derivatives of a $C_3$–$C_{24}$ ethylenically unsaturated nitrogen-containing reactant, e.g. acrylonitrile, and a copolymer of ethylene, at least one $C_3$ to $C_{50}$ alpha-monoolefin and at least one non-conjugated diene, said adduct containing from about 0.005 to 7% by weight nitrogen and having a number average molecular weight of from about 1000 to 500,000, in oil-soluble form have utility as a multi-functional V.I. improver for lubricating oils.

7 Claims, No Drawings

ETHYLENE COPOLYMER/ETHYLENICALLY UNSATURATED NITROGEN REACTANT ENE ADDUCTS HAVING UTILITY AS MULTIFUNCTIONAL V. I. IMPROVERS FOR LUBRICATING OILS

RELATED APPLICATIONS

This is a continuation of application Ser. No. 748,954, filed Dec. 9, 1976 which was a continuation-in-part of Ser. No. 668,610 filed Mar. 19, 1976 and now both abandoned.

This invention relates to nitrogen-containing polymeric ene adducts. More particularly, the invention relates to lubricating oil compositions containing said adducts as multifunctional additives especially those adducts derived from copolymers which have a substantially saturated hydrocarbon backbone chain with side chain unsaturation and unsaturated, polar, nitrogen-containing organic reactants, for example, adducts prepared by the thermal addition of nitrile monomers, e.g. acrylonitrile, to terpolymers of ethylene, propylene and at least one non-conjugated diene, e.g. 5-ethylidene-2-norbornene.

The literature abounds with discussions of multifunctional viscosity index (V.I.) improvers containing nitrogen to enhance their dispersant activity. Included therein are polymeric nitrile-containing substances as lubricating oil additives with detergent-dispersant and other properties.

The incorporation of any nitrile moiety in said V.I. improving polymeric substances according to the prior art was generally by conventional means including copolymerization of one or more olefins with a nitrile containing monomer (U.S. Pat. No. 3,445,387), free radical grafting as by hydroperoxidation of an ethylene copolymer directly with a polar vinylidene monomer, such as acrylonitrile (see U.S. Pat. No. 3,404,091), and reacting a nitrile-containing compound with a reactive copolymer such as is obtained from a free radical grafting of maleic anhydride to polyisobutylene (see U.S. Pat. No. 3,448,049).

These processes which utilize free radicals, either generated by shearing stresses during mastication or by heating organic compounds such as peroxides, to prepare a polymeric adduct have certain disadvantages, including irreversible crosslinking of the copolymer and homopolymerization of monomeric components. One of such disadvantages is shown in U.S. Pat. No. 3,236,917 which discloses adducts prepared by heating a mixture of ethylene/propylene copolymer and maleic anhydride in the presence of an organic peroxide which initiates the addition reaction by the generation of free radicals. Unfortunately, among other reactions generated therein, a molecule of maleic anhydride grafts into two copolymer chains thereby irreversibly crosslinking the copolymer and markedly decreasing its solubility in oil. One approach to overcoming this disadvantage is shown in U.S. Pat. No. 3,378,492 which teaches lubricating oil compositions which comprise a major proportion of a lubricating oil and a minor, but V.I. improving proportion of a reaction product of an unsaturated hydrocarbon polymeric compound, e.g. polybutadiene, with an unsaturated, polar, nitrogen-containing organic compound, e.g. acrylonitrile, which is grafted onto said polymeric compound by a free radical initiated reaction.

Another approach to preparing an oil-soluble nitrogeneous ashless dispersant involves reacting a polyolefin with acrylonitrile and chlorine or bromine at elevated temperatures, followed by reacting the product with enough aliphatic amine to replace the halogen atoms and thereafter with maleic anhydride and finally with an aliphatic amine or polyamine (see U.S. Pat. No. 3,914,203).

STATEMENT OF THE INVENTION

It has been found that multifunctional V.I. improvers of enhanced dispersancy can be obtained by thermally incorporating a $C_3$–$C_{24}$ ethylenically unsaturated nitrogen-containing reactant onto a carbon-to-carbon double bond which is pendant from a substantially saturated hydrocarbon polymer backbone by a thermal ("ene") addition. This saturated hydrocarbon polymer backbone is readily derived from ethylene backbone copolymers well known in the art. This finding has, in accordance with this invention, made possible the realization of a new class of products, which in their preferred form are useful as additives for lubricating oil compositions.

In their broadest form, this novel class of products of the invention can be characterized as ene adducts of a $C_3$–$C_{24}$ ethylenically unsaturated nitrogen-containing reactant and a copolymer of ethylene, at least one $C_3$–$C_{50}$ alpha-monoolefin and at least one $C_5$–$C_{24}$ non-conjugated diene, said adduct containing from about 0.005 to about 7% by weight nitrogen and a number average molecular weight of from about 1000 to about 500,000.

In their preferred form the products of the invention are oil-soluble ene adducts which provide outstanding dispersancy and have utility as ashless sludge dispersants.

Lubricating oil compositions of this invention comprise a major proportion of a lubricating oil and a minor, but V.I. improving proportion of an oil-soluble ene adduct of a $C_3$–$C_{24}$ ethylenically unsaturated nitrogen-containing reactant and copolymer of ethylene, at least one $C_3$ to $C_{50}$, preferably $C_3$ to $C_{18}$, alpha-monoolefin and at least one $C_5$–$C_{24}$ non-conjugated diene, said adduct containing from about 0.005 to 0.8, preferably 0.02 to 0.5% by weight nitrogen and a number average molecular weight ($\overline{M}n$) of from about 1000 to about 500,000 (preferably from about 1,000 to 10,000 for dispersant applications and from about 10,000 to 200,000 for V.I. improver-dispersant applications). The adducts of the invention are suited for lubricating oil applications when they possess sufficient oil-solubility, i.e. at least about 10 wt. % at 20° C. based on the total weight of the lubricating oil composition; however, when oil-insoluble these adducts of the invention have application as oil-resistant rubbers in seals and gaskets for automobile automatic transmissions or other such uses.

ETHYLENE BACKBONE COPOLYMERS

Copolymers of ethylene, at least one $C_3$ to $C_{50}$ alpha-monoolefin, and at least one non-conjugated diene are well known in the art. These copolymers have a substantially saturated hydrocarbon backbone chain which causes the copolymer to be relatively inert to ozone attack and oxidative degradation and side chain unsaturation available for adduct formation by means of the ene addition.

Propylene is normally selected as the $C_3$–$C_{50}$ alpha-monoolefin in preparing such copolymers because of its availability and for reasons of economics. Other alpha-monoolefins, such as 1-butene, 1-pentene, 1-hexene, 1-octadecene, etc. can be selected in place of or in addition to propylene in preparing such copolymers. The term EPDM as used herein refers to the copolymers of ethylene, propylene, and at least one non-conjugated diene useful for this invention; said diene usually $C_5$–$C_{24}$, preferably $C_6$–$C_{14}$.

An especially preferred class of EPDM is that in which the non-conjugated diene is monoreactive. Monoreactive non-conjugated dienes have one double bond which readily enters the copolymerization reaction with ethylene and a $C_3$–$C_{50}$ alpha-monoolefin, e.g. propylene, and a second double bond which does not, to any appreciable extent, i.e. less than about 20 percent, enter the copolymerization reaction. Copolymers of this class have maximum pendant group unsaturation for a given diene content, which unsaturation is available for adduct formation.

Monoreactive non-conjugated dienes which can be selected for preparing the preferred class of oil-soluble EPDM copolymers include linear aliphatic dienes of at least six carbon atoms which have one terminal double bond and one internal double bond, and cyclic dienes wherein one or both of the carbon-to-carbon double bonds are part of a carbocyclic ring. Of the linear dienes, oil-soluble copolymers of ethylene, propylene, and 1,4-hexadiene are preferred; of the cyclic dienes, oil-soluble copolymers of ethylene, propylene and 5-ethylidene-2-norbornene are preferred.

The useful ethylene, $C_3$ to $C_{50}$ alpha-monoolefin and $C_5$ to $C_{24}$ non-conjugated diene copolymers which are to be reacted with the ethylenically unsaturated nitrogen-containing reactant, e.g. the nitrile monomers, to form the ene adducts of the invention, comprise about 30 to 85 mole % ethylene; about 15 to 70 mole % of the higher, e.g. $C_3$ to $C_{18}$, optimally $C_3$ to $C_8$ olefin, and most preferably propylene; and about 0.5 to 20 mole % of the diene. Preferred are polymers of 40 to 70 mole % ethylene, 20 to 68 mole % of the higher olefin and 2 to 15 mole % of dienes. On a weight basis usually at least 2 or 3 wt. % of the polymer will be the non-conjugated diene. Mixtures of monoolefins and/or mixtures of non-conjugated dienes can be used.

Further examples of the above-noted alpha-monoolefins include 1-hexene, 1-heptene, 1-decene, 1-dodecene, 1-tetradecene, 1-hexadecene, 1-eicosene, 1-triacontene, 1-tetracontene, etc.

Representative non-limiting examples of non-conjugated dienes include:

A. Straight chain acyclic dienes such as: 1,4-hexadiene; 1,5-heptadiene, 1,6-octadiene, etc.

B. Branched chain acyclic dienes dienes such as: 5-methyl-1, 4-hexadiene; 3,7-dimethyl-1,6-octadiene, 3,7-dimethyl-1,7-octadiene; and the mixed isomers of dihydromyrcene and dihydroocimene.

C. Single ring alicyclic dienes such as: 1,4-cyclohexadiene; 1,5-cyclo-octadiene; 1,5-cyclododecadiene; 4-vinylcyclohexene; 1-allyl-4-isopropylidene cyclohexane; 3-allycyclopentene; 4-allyl-cyclohexene and 1-isopropenyl-4(4-butenyl) cyclohexane.

D. Multi-single ring alicyclic dienes such as: 4,4'-dicyclopentenyl and 4,4'-dicyclohexenyl dienes.

E. Multi-ring alicyclic fused and bridged ring dienes such as: tetrahydroindene; methyl tetrahydroindene; dicyclopentadiene; bicyclo (2.2.1) hepta-2,5-diene; alkenyl, alkylidene, cycloalkenyl and cycloalkylidene norbornenes such as: 5-methylene-2-norbornene; 5-ethylidene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene and 5-cyclohexylidene-2-norbornene.

In general, the preparation of copolymers suitable for the practice of this invention by means of ZieglerNatta catalysts is known in the prior art, for example see U.S. Pat. Nos. 2,933,480; 3,000,866; 3,093,621; 3,154,528; and 3,260,703. The copolymers, which are primarily produced for use in elastomeric compositions, are characterized by the absence of chain or backbone unsaturation, and when made from non-conjugated dienes contain sites of unsaturation in groups which are pendant to or are in cyclic structures outside the main polymer chain. These unsaturated structures render the polymers particularly resistant to breakdown by atmospheric oxidation or ozone. Ethylene-propylene-non-conjugated diolefin copolymers are known articles of commerce. In fact, various examples of such commercially available copolymers are VISTALON®, an elastomeric copolymer of ethylene, propylene and 5-ethylidene-2-norbornene, marketed by Exxon Chemical Co., New York, N.Y., and Nordel®, a copolymer of ethylene, propylene and 1,4-hexadiene, marketed by E. I. duPont de Nemours & Co., Wilmington, Del.

In general, the catalyst compositions used to prepare these copolymers comprise a principal catalyst consisting of a transition metal compound from Groups IVb, Vb and VIb of the Periodic Table of the Elements, particularly compounds of titanium and vanadium, and organometallic reducing compounds from Groups IIa, IIb and IIIa, particularly organoaluminum compounds which are designated as cocatalysts. Preferred principal catalysts of vanadium have the general formula $VO_zX_t$ wherein z has a value of 0 or 1 and t has a value of 2 to 4. X is independently selected from the group consisting of halogens having an atomic number equal to or greater than 17, acetylacetonates, haloacetylacetonates, alkoxides and haloalkoxides. Non-limiting examples are: $VOCl_3$; $VO(AcAc)_2$; $VOCl_2(OBu)$; $V(AcAc)_3$; and $VOCl_2(AcAc)$ where Bu is n-butyl or isobutyl and (AcAc) is an acetylacetonate.

Preferred cocatalysts have the general formula $AlR'_mX'_n$ wherein R' is a monovalent hydrocarbon radical selected from the group consisting of $C_1$ to $C_{12}$ alkyl, alkylaryl, arylalkyl and cycloalkyl radicals, X' is a halogen having an atomic number equal to or greater than 17, m is a number from 1 to 3 and the sum of m and n is equal to 3. Non-limiting examples of useful cocatalysts are: $Al(Et)_3$; $Al(IsoBu)_3$; $Et_2AlCl$; $EtAlCl_2$ and $Et_3Al_2Cl_3$.

Syntheses of the copolymers, which may be conducted, in batch, staged or continuous reactors, are preferably run in the presence of a purified solvent such as hexane which has been percolated through LINDE 3A catalyst and in the absence of moisture, air or oxygen and catalyst poisons. An atmosphere of oxygen-free nitrogen is preferably maintained above the reactants. Monomers, principal catalyst and cocatalyst are fed to the reactor supplied with means for withdrawing the heat of reaction and maintained under controlled agitation for a time, temperature and pressure sufficient to complete the reaction.

Suitable times of reaction will generally be in the range from 1 to 300 minutes, temperatures will usually be in the range of 0° C. to 100° C. and pressures from atomspheric to 160 psig are generally used. Monomer feed to the reactor per 100 parts by weight of solvent may be in the range of: ethylene, 2 to 20 parts by weight, $C_3$ to $C_{18}$ alpha-monoolefin, 4 to 20 parts by weight and non-conjugated diene, 0.1 to 10 parts by weight.

Principal catalyst, $VOCl_3$ for example, prediluted with solvents is fed to the reactor so as to provide a concentration in the range of 0.1 to 5.0 millimoles per liter. Cocatalyst, for example $Et_3Al_2Cl_3$, is at the same time fed to the reactor in an amount equal to from 2.0 to 20.0 moles of cocatalyst per mole of principal catalyst.

The copolymers may have molecular weights $\overline{M}_n$ of about 1000 to 500,000; preferably 10,000 to 200,000; and usually about 20,000 to 100,000. In general, polymers having a narrow range of molecular weight, as determined by the ratio of weight average molecular weight ($\overline{M}_w$) to number average molecular weight ($\overline{M}_n$) are preferred. Polymers having a $\overline{M}_w/\overline{M}_n$ of less than 10, preferably less than 7, and most preferably 4 or less are most desirable. Polymers in this range may be obtained by a choice of synthesis conditions such as choice of principal catalyst and cocatalyst combination and addition of hydrogen during the synthesis. Post synthesis treatment such as extrusion at elevated temperatures and under high shear through small orifices, and fractional precipitation from solution may also be used to obtain narrow ranges of desired molecular weights. For a comprehensive review of the art see: "Polymer Chemistry of Synthetic Elastomers", edited by Kennedy and Tornqvist, Interscience, New York 1969.

While these copolymers are essentially amorphous in character by superficial inspection, they may contain up to 25 percent by weight of crystalline segments as determined by X-ray or differential scanning calorimetry. Details of these methods for measurement of crystallinity are found in J. Polymer Sci. A-2, 9, 127 (1971) by G. VerStrate and Z. W. Wilchinsky.

Structurally, the copolymers suitable for conversion to nitrogen-containing ene adducts in practice of this invention may be illustrated for a number of non-conjugated diolefins as randomly distributed copolymers in which the following monomer moieties are linked in the polymer chain in a random sequence and in a varying number.

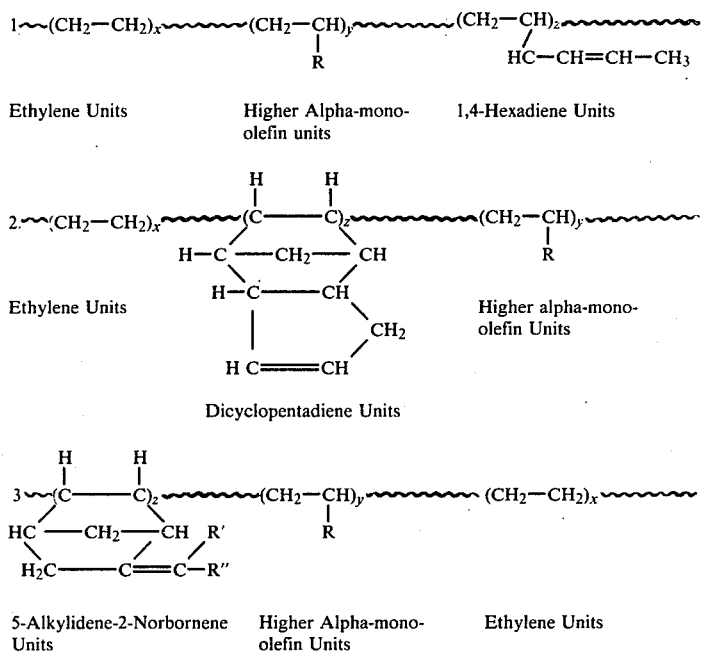

wherein R is a $C_1$ to $C_{48}$, preferably $C_1$ to $C_{16}$, straight or branched chain alkyl radical, R' and R" are independently selected from the group consisting of hydrogen and $C_1$ to $C_6$ alkyl radicals, and x, y and z are cardinal numbers, typically in the range of 1 to 100. It will be understood that the numberical values assigned to x, y and z are not necessarily totals for any monomer in the copolymer but that these numerical values express the number of times a given monmer may be repeated in the polymer chain before another monomer is interposed in the chain.

These ethylene backbone copolymers extend to those having recurring non-hydrocarbyl groups such as for example sulfone copolymers as described in U.S. patent application Ser. No. 654,204 filed on Feb. 2, 1976 and comprising the hydrocarbon soluble copolymers of an ethyleneically unsaturated polar monomer, sulfur dioxide and $C_2$ to $C_{50}$ olefinic monomers including up to 6 mole percent of non-conjugated dienes.

ETHYLENICALLY UNSATURATED NITROGEN-CONTAINING REACTANTS

Broadly, the ethylenically unsaturated nitrogen-containing reactants contemplated by the present invention generally consist of carbon, hydrogen and nitrogen and may also contain oxygen. It will be understood, however, that these nitrogen-containing reactants may also contain substituent groups such as keto, hydroxyl, ether, mercapto, sulfide, sulfoxide, sulfonyl, etc. Generally, these nitrogen-containing reactants will contain about 3 to 24 carbon atoms and about one nitrogen atom per molecule and must contain an electron withdrawing group in such proximity to the unsaturation whereby the olefinic bond is activated by at least one electron-attracting group.

The preferred nitrogen-containing reactants, i.e. unsaturated, polar, nitrogen-containing enophiles, to which the present invention is directed have the formula

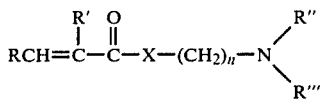

wherein X is oxygen, or an NR group, n is a whole number from 2 to 5, R and R' are either hydrogen or a $C_1$ to $C_4$ alkyl group, R" and R'" are each $C_1$ to $C_{12}$, preferably $C_1$ to $C_4$, hydrocarbyl groups, e.g. alkyl groups. The various R groups may be the same or different. Amino methacrylates such as dialkylaminoalkyl methacrylates are particularly useful.

Specific examples of compounds which may be employed as the preferred nitrogen-containing enophiles include dimethylaminoethyl methacrylate, diethylaminopropyl methacrylamide, di(isobutyl) aminoethyl methacrylate, methylisobutylaminopropyl acrylate, 4-vinyl pyridine, ethylene imine, N-vinyl pyrrolidone etc. Mixtures of various nitrogen-containing enophiles may be thermally reacted as well as the individual reactants with the ethylene backbone copolymers.

The most preferred nitrogen-containing enophiles, i.e. unsaturated, polar, nitrogen-containing organic compounds, to which the present invention is particularly directed are nitriles having the formula:

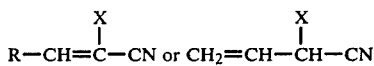

wherein R is a hydrogen atom or a lower alkyl, e.g., methyl, ethyl, and the like, X is a hydrogen atom, a halogen atom, a cyano or a lower alkyl group, e.g. methyl, ethyl, propyl, butyl and the like. Non-limiting examples of nitrile monomers which are contemplated by the aforedescribed structure include, acrylonitrile, methacrylonitrile, alpha-bromoacrylonitrile, alpha-chloroacrylonitrile, vinylidene cyanide, allyl cyanide, and the like.

PREPARATION OF THE ENE ADDUCT

The thermal ene addition of the ethylenically unsaturated nitrogen-containing reactant to the saturated ethylene backbone copolymer having pendant group carbon-to-carbon unsaturation is theorized to occur by the following reaction (using a copolymer of ethylene, propylene and 5-ethylidene-2-norbornene and acrylonitrile as the thermal ene reactants):

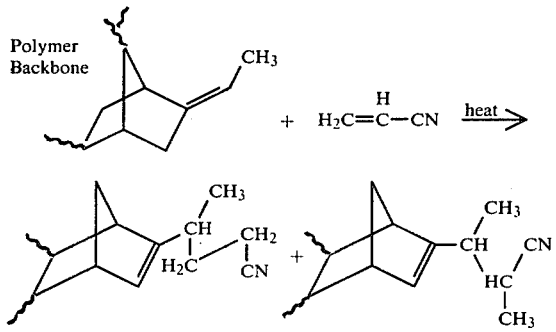

A molecule of acrylonitrile adds to the polymer at the site of pendant group unsaturation and involves allylic shift of one double bond, transfer of the allylic hydrogen to the acrylonitrile and thus bonding between the two unsaturated groups. It is understood that the exocyclic olefin, i.e. of the 5-ethylidine-2-norbornene, can only shift away from the bridgehead to the $C_5$–$C_6$ position. A shift of the double bond toward the bridgehead, i.e. $C_4$–$C_5$, is forbidden by Bredt's rule.

Ene adducts of this invention can be prepared by any process which intimately mixes the nitrogen-containing reactant or reactants with the copolymer and concurrently or subsequently heats the mixture to a temperature where thermal ene addition occurs without appreciable generation of free radicals. Reaction temperatures will generally be at least 100° C. to obtain adduct formation at acceptable rates and less than about 250° C. to avoid any significant copolymer breakdown and/or homopolymerization of the ethylenically unsaturated nitrogen-containing reactant. Although preferred temperature ranges will vary with the particular copolymer and reactant and can readily be determined by one skilled in the art; optimally, it ranges from about 150° C. to about 225° C., e.g. about 170° C. Mixing of the reactant and copolymer can be by blending together near or with a solvent in an internal mixer or extruder. Preferably the blending and subsequent "ene" reaction is carried out in a hydrocarbon solvent; optimally mineral oil, at elevated temperatures.

Thus in the preferred process, the ethylene backbone copolymer is dissolved in a hot solvent such as benzene, heptane, cyclohexane, optimally, mineral oil, and the reactant e.g. acrylonitrile, is introduced into the solution. The solution is heated at from about 150° C. to 225° C. for several hours in the substantial absence of air or oxygen and, preferably under a blanket of inert gas, e.g., nitrogen. Modest elevated pressures of the inert gas can be used to maintain the reactant in solution. Should a solvent other than mineral oil be used, diluent oil may be added and the light solvent and unreacted ethylenically unsaturated nitrogen-containing reactant are then removed. The remaining residue is a solution of one adduct in diluent oil, particularly useful as an additive package for lubricating oils.

For said reactants which readily homopolymerize under free radical conditions a modified reaction method may be utilized in order to moderate the generation of free radicals. Such a modified method is delineated as follows: dissolve said copolymer, said reactant and up to about 1 wt. % (based on weight of said reactant) of a free radical scavenger (inhibitor such as hydroquinone to eliminate homopolymerization of said reactant) in a hot solvent, such as mineral oil, heptane, benzene, or cyclohexane; and, heat to reaction temperatures, e.g. from about 150° C. to 225° C. for several hours in the substantial absence of oxygen (flushed several times with nitrogen prior to starting the reaction) and under a blanket of modestly pressurized inert gas such as nitrogen. If the solvent is not oil, then diluent oil may be added and the light solvent and unreacted nitrile monomer can be readily removed. The remaining residue is a mixture of ene adduct of the ethylene copolymer and said reactant in diluent oil.

The proportions in which the above-described nitrogen-containing reactants are to be used may range widely according to the ability of said ethylene copolymer and said nitrogen-containing reactant to react with each other, but normally should range from about 0.1 to 400, preferably about 10 to about 200 parts by weight of said nitrogen-containing reactant to 100 parts by weight of said ethylene backbone copolymer.

It is generally desired to form oil-soluble adducts containing about 0.005 to 0.6%, and preferably about 0.02 to 0.50% by weight nitrogen (all of said % by weight nitrogen values in this specification determined by the Kjeldahl method). Adducts containing such quantities of nitrogen have sufficient dispersancy sites for additive applications, to enhance lubricating oil performance. To achieve a desired degree of adduct formation within a reasonable time, high concentrations of reactants (usually a substantial excess of nitrogen-containing reactant) are helpful. One will generally select an ethylene copolymer having about thrice the amount of pendant group unsaturation as is stoichiometrically (based on nitrogen equivalent) required for the desired amount of nitrogen incorporation. Similarly, about two to five times as much nitrogen-containing reactant (based on equivalent nitrogen) is added as is desired in the oil-soluble adduct. Conversion of about 20 to 50% of the nitrogen containing reactant will result in copolymer adduct having the desired composition. For example, if one desires to obtain an adduct derived from an ethylene/propylene/5-ethylidene-2-norbornene copolymer having 0.5 wt. % nitrogen content, he could conveniently mix said copolymer having 0.08 moles pendant group unsaturation per kilogram of copolymer with 0.2 moles of acrylonitrile as said reactant and heat the mixture for a time sufficient to convert 25% of the nitrile reactant thereby obtaining the desired product.

It will be understood that, if desired, two or more different ethylene backbone copolymers and/or two or more different types of nitrogen-containing reactants can be reacted to produce useful ene adducts of the invention.

Ene adducts of the invention broadly will contain from 0.005% to about 7% by weight nitrogen. As the nitrogen content increases above about 0.6 wt. %, the ene adduct becomes increasingly less soluble in hydrocarbons such as mineral oil whereby the adducts utility as a hydrocarbon resistant material is increased. Further, the ene adduct undergoes reduced elasticity as the nitrogen content increases above about 1 wt. %.

POST REACTIONS OF ENE ADDUCTS

These ene adducts which include polar groups such as imides, amides, esters, anhydrides, epoxides, nitriles (preferred), etc., may also be hydrolyzed to produce novel polymeric compositions which can be used per se as a dispersant and/or V.I. improver or which can be used as an intermediate for the preparation of other novel polymers are particularly useful as multifunctional V.I. improvers for mineral oil lubricants. When used as intermediates, these hydrolyzed ene adducts of the invention can be tailored to provide varying functional groups requisite for a given application. For example, as in the case of an adduct produced with acrylonitrile, the resultant ene adduct can be readily hydrolyzed to provide sites for reaction with alkylene polyamines to provide enhanced lube oil dispersancy.

The hydrolysis of these ene adducts of the invention is readily carried out under alkaline (base hydrolysis) or acidic (acid hydrolysis) conditions. Suitable bases include alkali metal and alkaline earth metal bases such as sodium hydroxide, potassium hydroxide, calcium hydroxide, barium hydroxide and the like. Suitable acids are mineral acids such as sulfuric acid, nitric acid, hydrochloric acid and the like. Both the base and acid hydrolysis can be carried out at a temperature ranging from about 0° C. to about 225° C., preferably from about 20° C. to about 125° C. The hydrolysis is usefully carried out at relatively mild conditions, i.e. only a catalytic amount of the hydrolyzing agent is employed. The hydrolysis reaction conditions involved in the conversion of these polar groups into the corresponding carboxylate groups such as acids, amides, esters, etc., are well known and need not be further detailed herein.

The corresponding carboxyl containing adducts either in their original solution or after isolation and redissolving in suitable hydrocarbon solvents of the type mentioned are contacted with approximately equimolar amounts of nucleophilic reagents to convert the carboxyl derivatives into the new nucleophilic derivatives.

Non-limiting examples of suitable functional nucleophilic reagents are: water, $C_1$ to $C_{13}$ alcohols, $C_1$ to $C_{18}$ preferably $C_2$ to $C_{12}$ monobasic acids, $C_1$ to $C_{18}$ amines, $C_2$ $C_{18}$ amides, phenol, thiophenol, alkyl phenols or thiophenol with 1 to 4 alkyl groups of 1 to 12 carbons each, $C_1$ to $C_{18}$ alkyl mercaptans, dialkylaminophenols, N,N-dialkylaminoarylene diamines, alkyl imidazolines, aryl ether alcohols, alkyl ether alkylene amines and the like.

Further descriptions of preferred forms of some of these functional agents follow:

The $C_1$ to $C_{13}$ alcohols can be branched or unbranched saturated, aliphatic, aromatic, primary, secondary, or tertiary alcohols, preferably monohydric alcohols, but including other alcohols. Particularly preferred are polyhydric alcohols of 2 to 6 hydroxy groups as well as amino alcohols. Examples include methanol, isopropanol, $C_8$ Oxo alcohol, lauryl alcohol, benzyl alcohol, ethylene glycol, monododecyl ether of triethylene glycol, glycerol, pentaerythritol, glucose, dipentaerythritol, sorbitol, Cellosolve ®, Carbitol ®, diethanolamine, etc.

The $C_1$ to $C_{18}$, preferably $C_2$ to $C_{12}$ monobasic acids, can be branched or unbranched, saturated, aliphatic, monocarboxylic acids, preferably the saturated fatty acids, such as acetic acid, butyric acid, caproic acid, lauric acid, etc.

The $C_1$ to $C_{18}$ amines can be branched or unbranched saturated, aliphatic, primary or secondary amines, containing 1 to 8 nitrogens, preferably mono- or diamines, such as ethylamine, butylamine, sec. butylamine, diethylamine, etc., but including higher polyamines such as alkylene polyamines, wherein pairs of nitrogen atoms are joined by alkylene groups of 2 to 4 carbon atoms. Thus, polyamines of the formula:

$$NH_2(CH_2)_n-[NH(CH_2)_n]_m-NH_2$$

are included where n is 2 to 4 and m is 0 to 6. Examples of such polyamines include tetraethylene pentamine, tripropylene tetramine, N-aminoalkyl piperazines, e.g., N-(2-aminoethyl) piperazine, N,N'-di(2-aminoethyl) piperazine, etc. Particularly preferred are the $C_4$ to $C_{13}$ N,N-dialkylamino alkylene diamines such as N,N-dimethyl-1,3-propylene-diamine, etc. Also, preferred is tetraethylene pentamine, as well as corresponding commercial mixtures such as "Polyamine H," and "Polyamine 500."

The alkyl phenols or thiophenols are those with 1 to 4 alkyl groups, preferably averaging 1 to 2 alkyl groups, wherein the alkyl groups each contain 1 to 12 carbon atoms which can be straight chain or branched chain such as cresol, n-octyl phenol, di-n-octyl phenol, monoisobutyl thiophenol, etc.

The above-discussed reactions with the hydrolyzed adduct can be carried by procedures well known in the art. For the preferred amine functionalization the amination of the carboxylate groups is usefully carried out in a solution by reaction with the hydrolyzed ene adduct dissolved in a solvent such as mineral oil. The formation of the amide dispersants in high yield can be effected by adding from about 0.1 to 1, preferably about 0.7 to 1, molar proportions of alkylene polyamine per molar proportion of carboxylate groups per kilogram of the hydrolyzed adduct to said solution and heating the mixture at 140° C. to 165° C. until the appropriate amount of water of reaction is evolved.

In some applications, it is useful to modify the aminated hydrolyzed ene adduct dispersant by subsequent boration as generally taught in U.S. Pat. Nos. 3,087,936 and 3,254,025 (incorporated herein by reference thereto). This is readily accomplished by treating said aminated ene adduct with a boron compound selected from the class consisting of boron oxide, boron halides, boron acids and esters of boron acids in an amount to provide from about 0.3 to 0.9 wt. % boron based on the total weight of said borated, aminated, hydrolyzed ene adduct.

The nitrile ene adduct can also be converted to the corresponding imine or amine or mixtures of both through reductive procedures well known to one skilled in the art. Although the preferred method of reduction may be accomplished with hydrogen catalysts such as but not limited to copper, rhodium, palladium or nickel at elevated temperatures and pressures, other less desirable methods of reduction may also be used. Other reductive techniques such as lithium aluminum hydride, sodium borohydride, dissolving metal reductions such as potassium in ammonia are other such methods. Another suitable method of converting said nitrile to an amine is through the use of Grignard reagents.

It is understood that the placement of a nitrile such as described above onto said chain now provides a site for further reactions such as chlorination, bromination, alkylation, or the like. Once halogenated, this position may be reacted with various nucleophiles as described above to produce a new type of functionality. For example, the halogen may be displaced with an amine, to provide additional functionality.

ADDUCT APPLICATIONS

Generally, the number average molecular weights of the final polymeric adducts of the present invention, employed as lubricant additives, will be in the range of about 1000 to about 500,000 and preferably will be in the range of about 10,000 to 200,000. However, it will be understood that higher or lower molecular weight products may be prepared in accordance with the present invention, if desired.

All molecular weight values set forth in this specification are number average molecular weights ($\overline{M}n$) as determined by vapor phase osmometry (VPO) and membrane osmometry.

When the adduct additives of the present invention are employed in lubricating oils, they are preferably added in proportions of about 0.01 to about 20.0% or more, preferably about 0.1 to 10.0%, and more preferably about 0.5 to 5.0 percent by weight. The proportions giving the best results will vary somewhat according to the nature of the adduct additive, the nature of the lubricating oil base stock to which it is added and the specific purpose which the lubricant is to serve in a given case. For commercial purposes, it is convenient to prepare concentrated oil solutions in which the amount of adduct additive in the composition ranges from 10 to about 49% by weight, and to transport and store them in such form. In preparing a lubricating oil composition for use as a crankcase lubricant the adduct additive concentrate is merely blended with the base oil in the required amount.

The products of the present invention may be employed not only in ordinary hydrocarbon lubricating oils but also in the "heavy duty" type of lubricating oils which have been compounded with such detergent type additives as metal soaps, metal petroleum sulfonates, metal phenates, metal alcoholates, metal alkyl phenol sulfides, metal organo phosphates, thiophosphates, phosphites and thiophosphites, metal salicylates, metal xanthates and thioxanthates, metal thiocarbamates, amines and amine derivatives, reaction products of metal phenates and sulfur reaction products of metal phenates and sulfur, reaction products of metal phenates and phosphorus sulfides, metal phenol sulfonates and the like. Thus, ene adduct additives of the present invention may be used in lubricating oils containing other additives such as barium nonyl phenol sulfide, calcium tert.-amylphenol sulfide, nickel oleate, barium octadecylate, calcium phenol stearate, zinc diisopropyl salicylate, aluminum naphthenate, calcium cetyl phosphates, barium d-tert.-amylphenol sulfide, calcium petroleum sulfonate, zinc methylcyclohexyl thiophosphate, calcium dichlorostearate, etc. Other types of additives such as phenols and phenol sulfides may be employed.

The lubricating oil base stocks used in the compositions of this invention may be straight mineral lubricating oils or distillates derived from paraffinic, naphthenic, asphaltic, or mixed base crudes, or, if desired, various blended oils may be employed as well as residuals, particularly those from which asphaltic constituents have been carefully removed. The oils may be refined by conventional method using acid, alkali and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc. Hydrogenated oils, white oils, or shale oil may be employed as well as synthetic oils prepared, for example, by the polymerization of olefins or by the reaction of oxides of carbon with hydrogen or by the hydrogenation of coal or its products.

Synthetic lubricating oils may also be employed which have a viscosity of at least 30 SUS at 38° C. such as esters of monobasic acids (e.g. ester of $C_8$ Oxo alcohol with $C_8$ Oxo acid), esters of dibasic acids (e.g. dinonyl adipate), esters of glycols (e.g. $C_{13}$ Oxo acid diester of tetraethylene glycol), complex esters, esters of phosphoric acid (e.g. the ester formed by contacting three moles of the mono methyl ether of ethylene glycol with one mole of phosphorus oxychloride), halocarbon oils (e.g. the polymer of chlorotrifluoroethylene), alkyl silicates (e.g. polymethyl siloxanes), sulfite esters (e.g. ester formed by reacting one mole of sulfur oxychloride with two moles of the methyl ether of ethylene glycol, etc.), carbonates (e.g. the carbonate formed by reacting $C_8$ Oxo alcohol with ethyl carbonate to form a half ester and reacting this half ester with tetraethylene glycol), mercaptals (e.g. the mercaptal formed by reacting 2-ethyl hexyl mercaptan with formaldehyde), formals (e.g. the formal formed by reacting $C_{13}$ Oxo alcohol with formaldehyde), polyglycol type synthetic oils (e.g. the compound formed by condensing butyl alcohol with fourteen units of propylene oxide, etc.), or mixtures of any of the above (or with mineral, animal or vegetable oils) in any proportions may also be used.

For best results the base stock chosen should normally be that of an oil which (without the new adduct additive present) gives the optimum performance in the service contemplated, e.g. lubricating oils for normal applications have a viscosity which usually ranges from about 40 to 150 seconds Saybolt viscosity at 99° C. but for the lubrication of certain low and medium speed diesel engines the lubricating oil base stock is prepared from naphthenic or aromatic crudes and has a Saybolt viscosity at 99° C. of 45 to 90 seconds and for gasoline engine service, oils of higher viscosity index are often preferred, for example, up to 75 to 100, or even higher, viscosity index.

The invention will be further understood by reference to the following examples which include preferred embodiments.

EXAMPLE 1

6.75 grams of an ethylene copolymer consisting about 50 wt. % ethylene, 41 wt. % propylene and 9 wt. % of 5-ethylidene-2-norbornene having a number average molecular weight of about 60,000 and a 127° C. Mooney viscosity of 50 was dissolved in 83.25 grams of Solvent-150 N mineral oil was placed in a 500 ml. reaction vessel supported on an electric heater so that the temperature of the reactants could be controlled. 2.7 grams (0.05 moles) of acrylonitrile was introduced into the reaction vessel after which the vessel was flushed with nitrogen and subjected to a nitrogen pressure of about two inches of mercury which elevated pressure was maintained during the entire reaction period. The reaction was carried out by heating the ingredients with agitation at a temperature of about 150° C. for about 6 hours. The reaction vessel was thereafter cooled to room temperature and the adduct product was freed of other materials by dialysis against a semipermeable rubber membrane overnight with boiling hexane. The dialyzed residue was then dried for about 12 hours in a vacuum oven maintained at about 60° C. and 120 mm Hg pressure whereby 4.15 grams of product adduct was obtained which contained 0.074 weight % nitrogen as determined by Kjeldahl method.

EXAMPLE 2

The procedure of Example 1 was followed with the following variations:

The ethylene copolymer contains about 50 wt. % ethylene, 45 wt. % propylene and 5 wt. % 5-ethylidene-2-nobornene with a ($\overline{M}_n$) of about 45,000; 5 grams of said polymer was dissolved in 60 grams of said mineral oil; 1 gram (0.006 moles) of N,N-dimethylamino ethyl methacrylate replaced the acrylonitrile; and the reaction was carried out at a temperature ranging from 190° to 210° C. for 7 hours; and, 3.0 grams of an adduct product containing 0.03 wt. % nitrogen (Kjeldahl) was realized.

EXAMPLE 3

The process of Example 1 was followed however the ingredients and conditions was varied in the following manner:

The ethylene copolymer was about 50 wt. % ethylene, 46 wt. % propylene and 4 wt. % 1,4-hexadiene with a ($\overline{M}_n$) of about 50,000. (This ethylene copolymer is available as Nordel 1320 from E. I. duPont de Nemours & Co., Wilmington, Del.); 2.25 grams of said polymer was dissolved in 67.75 grams of Solvent 150 N mineral oil; the amount of acrylonitrile was 20 grams (10 grams added after 5 hours); the reaction conditions were 150° to 160° C. for 12 hours; and, the product yield was 2.1 grams of the adduct product containing 0.20 wt. % nitrogen (Kjeldahl).

EXAMPLE 4

In this example the general procedure of Example 1 was followed, however, the polymerization vessel was replaced with a 3-liter rocker bomb into which 200 grams of the ethylene copolymer of Example 1, 2200 ml of heptane, 25 grams (0.47 moles) of acrylonitrile and 2 grams of hydroquinone were introduced and the vessel sealed. The atmosphere in the vessel was replaced with nitrogen and then pressurized with nitrogen to about 500 psi at room temperature. The bomb was rocked at a temperature from about 171° to 179° C. for 19 hours. The product was separated by precipitation from methanol and yielded 105 grams of recovered adduct containing about 0.084 wt. % nitrogen (Kjeldahl).

EXAMPLE 5

The 3 liter rocker bomb described above was used in this Example. 200 grams of the ethylene copolymer of Example 2, 2200 ml of heptane, 11 grams (0.21 moles) of acrylonitrile and 1 gram of hydroquinone were introduced and the bomb sealed. The contained air was replaced with nitrogen and then the reactor was pressurized with nitrogen to about 500 psi at room temperature. The bomb was sealed and rocked at a temperature of 150° for 10 hours then 200° for 2 hours. The reactor was next cooled, 200 cc of sample taken, then 100 grams (1.88 moles) of additional acrylonitrile added, and the above procedure repeated at a temperature of 150° for 12 hours. The reactor was cooled and the product recovered by precipitation from methanol to yield 143 g. of adduct which contained 0.092 wt. % nitrogen (Kjeldahl).

EXAMPLES 6-9

The following examples are all set forth in tabular form in Table I.

TABLE I

| Example | Type | Wt.gms. | Solvent 150-N Mineral Oil Wt. grams | Acrylonitrile Wt.grams | Reaction Conditions Time,hrs. | Press.(psi) | Temp.°C. | Yield (grams) | %N |
|---|---|---|---|---|---|---|---|---|---|
| 6 | of Ex.1 | 6 | 74 | 4 | 6 | 18 | 150 | 3.42 | 0.023 |
| 7 | of Ex.2 | 6 | 74 | 2.7 | 6 | 18 | 150 | 4.10 | 0.14 |
| 8 | of Ex.2 | 6 | 74 | 4 | 6 | 18 | 150 | 4.18 | 0.15 |
| 9 | EPDM[2] | 200 | 1800 ml. | 40* | 15 | 500 | 150-170 | — | 0.094 |

EPDM[2] is a copolymer of ethylene (43.7 wt. %) - propylene (52.2 wt.%) - 5-ethylidene-2-norbornene (4.1 wt. %) having a $\overline{M}_n$ of about 60,000.
*2.0 grams hydroquinone added to reaction system.

EXAMPLE 10

200 grams of the copolymer of Example 2 (reacted as a 10 wt.% solution in hexane) was processed similar to the procedure of Example 5 with the following variations: the pressure was 400 psi; the bomb rocked at 170° C. for 15 hours; the reactor contents were filtered prior to precipitation; and, the resulting yield of product after drying in a vacuum oven was 130.7 grams of an ene adduct which contained 0.075 wt. % nitrogen (Kjeldahl).

EXAMPLE 11

(A) The following illustrates hydrolysis of an ene adduct. Into a clean dry flask, under a nitrogen atmosphere was carefully placed a sample of the ene adduct of Example 10 (5 g. of adduct) in toluene (100 ml) and refluxed with 3 g. potassium hydroxide dissolved in 15 cc distilled water. The refluxing took place at ca. 90° C. (90°–94° C.) for 6.0 hours. The solution was cooled to ambient temperature and the hydrolyzed copolymer recovered by precipitation from methanol (2 liter). The resulting copolymer was washed with methanol (500 ml) then dried in a vacuum oven at 100° C. for about 15 hours, after which 4.05 g of copolymer was recovered. The nitrogen level of the resulting copolymer was 0.03 wt.% (Kjeldahl).

(B) The following illustrates amination of a hydrolyzed ene adduct. 2 g. of the copolymer of Example 11(A) above was dissolved in toluene (100 ml) then carefully refluxed (110° C.) under a nitrogen atmosphere with a solution of 0.5 g diethylene triamine for 5 hrs. The solution was cooled to ambient temperature and the aminated copolymer recovered by precipitation from methanol to yield 1.9 g of product (95% yield). The nitrogen level of the resulting product was 0.09 wt.% (Kjeldahl).

EXAMPLE 12

In this example the efficacy of the adducts of this invention, particularly with regard to their unusual dispersancy properties in lubricating oil applications, is illustrated by comparison with a commercially available multifunctional V.I. improver, sold as Lz3702 by Lubrizol Corporation of Cleveland, Ohio, in a Sludge Inhibition Bench Test (hereinafter designated SIB). The SIB test has been found, after a large number of evaluations, to be an excellent test for assessing the dispersing power of lubricating oil dispersant additives.

The medium chosen for the SIB test was a used crankcase mineral lubricating oil composition having an original viscosity of about 325 SUS at 38° C. that had been used in a taxicab that was driven generally for short trips only, thereby causing a buildup of a high concentration of sludge precursors. The oil that was used contained only a refined base mineral lubricating oil, a viscosity index improver, a pour point depressant and zinc dialkyldithiophosphate antiwear additive. The oil contained no sludge dispersant. A quantity of such used oil was acquired by draining and refilling the taxicab crankcase at 1000–2000 mile intervals.

The Sludge Inhibition Bench Test is conducted in the following manner. The aforesaid used crankcase oil, which is milky brown in color, is freed of sludge by centrifuging for 1 hour at about 39,000 gravities (gs.). The resulting clear bright red supernatant oil is then decanted from the insoluble sludge particles thereby separated out. However, the supernatant oil still contains oil-soluble sludge precursors which on heating under the conditions employed by this test will tend to form additional oil-insoluble deposits of sludge. The sludge inhibiting properties of the additives being tested are determined by adding to portions of the supernatant used oil, a small amount, such as 0.5, 1 or 2 weight percent, on an active ingredient basis, of the particular additive being tested. Ten grams of each blend being tested is placed in a stainless steel centrifuge tube and is heated at 280° F. for 16 hours in the presence of air. Following the heating, the tube containing the oil being tested is cooled and then centrifuged for 30 minutes at about 39,000 gs. Any deposits of new sludge that form in this step are separated from the oil by decanting the supernatant oil and then carefully washing the sludge deposits with 25 ml. of pentane to remove all remaining oil from the sludge. Then the weight of the new solid sludge that has been formed in the test, in milligrams, is determined by drying the residue and weighing it. The results are reported as % of sludge dispersed by comparison with a blank not containing any additional additive. The less new sludge formed, the larger the value of percent sludge dispersant, and the more effective is the additive as a sludge dispersant. In other words, if the additive is effective, it will hold at least a portion of the new sludge that forms on heating and oxidation, stably suspended in the oil so it does not precipitate down during the centrifuging. Using the above-described test, the dispersant action of the several adducts prepared in accordance with this invention were compared with the dispersing power of a dialyzed product obtained from dialysis of a commercial dispersant previously referred to as Lz 3702. Sufficient dialyzed residue which analyzed about 0.4 wt. % nitrogen, was dissolved in S-150N mineral oil to provide a 10% active ingredient concentrate. The dialyzed residue and adduct products of the invention were appropriately diluted in mineral oil to furnish the 0.0125, 0.025, 0.05 and 0.1 wt. % of added additive test samples. The test results are given in Table II.

TABLE II

| Example | Polymer of | Concn. gms. polymer/10 gms. Used Oil | % sludge dispersed |
|---|---|---|---|
| 12-A | Example 1 | .1 | 96 |
|  |  | .05 | 88.4 |
|  |  | .025 | 37.5 |
| 12-B | Example 2 | .1 | 82 |
|  |  | .05 | 53 |
| 12-C | Example 3 | .1 | 52.5 |
|  |  | .05 | 37.6 |
| 12-D | Example 4 | .1 | 79.9 |
|  |  | .05 | 49.3 |
| 12-E | Example 5 | .1 | 91.5 |
|  |  | .05 | 80.1 |
|  |  | .025 | 62.0 |
|  |  | .0125 | 36.7 |
| 12-F | Example 6 | .1 | 96 |
|  |  | .05 | 73 |
| 12-G | Example 7 | .1 | 79.3 |
|  |  | .05 | 72.4 |
| 12-H | Example 8 | 0.1 | 95.0 |
|  |  | .05 | 90.3 |
|  |  | .025 | 32.0 |
| 12-I | Example 9 | .1 | 82.7 |
|  |  | .05 | 71.6 |
| 12-J | Lz3702 | .1 | 88.7 |
|  |  | .05 | 73.3 |
|  |  | .025 | 30.5 |
|  |  | .0125 | 4.8 |
| 12-K | Example 11 | 0.1 | 78 |
|  |  | 0.05 | 79 |

The ene adducts of Examples 1–11 are derived from copolymers which have viscosity index improving properties for lubricating oils. The data of Table II therefore shows that the multifunctional V.I., ene adducts and ene adduct derivatives of the invention possess superior dispersancy to a commercially available multifunctional V.I. additive. The superior dispersancy is obtained at a much lower nitrogen content, e.g. the nitrogen (Kjeldahl) of Example 1 is 0.074 wt. % whereas that of Lz3702 is 0.4 wt. %. It is also apparent from Table II that an adduct prepared from a polymer containing a cyclic nonconjugated diene is superior in dispersancy to one obtained from a polymer containing a linear non-conjugated diene (compare Examples 12-A with Example 12-C).

EXAMPLE 13

The nitrogen-containing adduct of the ethylene copolymer prepared in Example 9 was tested as a viscosity index improver in ENJ 102 a blended mineral lube oil containing 0.5 wt. % of a polymeric pour depressant. The blend was of two paraffinic, solvent refined neutral oils, one of which had a viscosity of about 150 SUS at 100° F. and constituted 25.75 weight percent of the blend; and, the other had a viscosity of about 300 SUS at 100° F. and constituted 73.75 weight percent of the blend. The comparative results of the adduct modified ENJ 102 (Example 13-A) and the ENJ 102 (Example 13-B) are summarized in Table III.

TABLE

| Example | K.V. (Cs) @99° C. | Vis. (P) @−18° C. | Pour Pt. °C. | % sonic breakdown |
|---------|------|------|-----|----|
| 13-A | 12.21 | 23.5 | −37 | 29 |
| 13-B | 6.26 | 19.2 | −37 | 0 |

The data of Table III shows that an adduct of this invention has V.I. improving characteristics while exhibiting no detrimental loss in pour point depression and suitable shear stability as represented by sonic breakdown.

Although the invention heretofore disclosed has been directed to ethylenically unsaturated nitrogen-containing reactants, the thermal "ene" addition of the —C=C— moiety to the ethylene copolymer at the site of the pendant group unsaturation will occur if said moiety has any electron withdrawing group bonded to it in appropriate proximity to activate said olefinic bond moiety. Thus, the "ene" reaction of the invention extends and contemplates production of adducts from said ethylene copolymer and any ethylenically unsaturated reactant of the general formula

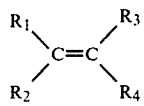

wherein $R_1$ is hydrogen, $R_2$ is hydrogen or a $C_1$ to $C_{30}$ alkyl radical and $R_3$ is hydrogen or $R_4$, and $R_4$ is selected independently from the group consisting of $C_1$ to $C_{30}$ straight and branched chain alkyl, arylalkyl, cycloalkyl, alkenyl, arylalkenyl and cycloalkenyl moieties and/or one or more reactive groups of the class consisting of alkyl unsaturation, carboxyl, epoxide, thiol, carbonyl, thionyl, hydroxy, acylhalide, halo, dicarboxylic acid anhydride, thiolic anhydride, dithionic anhydride, or one-half of cyclic thiolic anhydride or one-half of cyclic thionic anhydride or one-half of cyclic dithionic anhydride. Non-limiting examples include: 2-chloroethyl acrylate; (β-chlorallyl) acrylate; (2-ethoxyethyl) acrylate; acryloyl chloride, acrylic acid; thioacrylic acid; thionacrylic acid; acrolein; ethyl vinyl ketone; 1-chloro-butenyl-ethyl ketone; vinyl chloride; B,4,4,4-trichlorobutene-1; p-chlorallyl-benzene; p-(chloromethyl)-styrene; 4-chloro-1-vinyl naphthalene; vinylidene chloride; 1-chloro-1-benzyl ethylene; α-ethyl-m(trichloromethyl)styrene; methyl crotonate; allyl benzene, methyl isopropenyl ketone; fumaryl chloride; 1-hexenyl hexyl sulfide; vinyl chlorosilane; dimethyl acetylene dicarboxylate; maleic acid; fumaric acid; and citraconic acid.

A commercially available mixture of the 3- and 4-isomers of chloromethyl styrene is sold as VBC (vinyl benzyl chloride) by Dow Chemical Co., Midland, Mich.

These adducts derived from the "ene" reaction with ethylene copolymers have utility as oil-soluble additives providing enhanced lubrication properties to hydrocarbon lubricating oils, e.g. those adducts containing substantially amounts of sulfur will enhance the load carrying ability of said oils and/or oxidation-resistance and/or rust-resistance, etc. and the presence of silicon will usefully modify the flow and/or foaming properties, etc. of said oils.

The ene reaction as reported in the literature has been defined as the indirect substituting addition of a compound with a double bond (enophile) to an olefin with an allylic hydrogen (ene) and involves allylic shift of one double bond, transfer of the allylic hydrogen to the enophile and bonding between the two unsaturated termini. (See Hoffman, ∓The Ene Reaction", Angew, Chem. internat., Edit., Vol. 8, 556–578 (1969)).

The ene adducts are readily distinguished from other functionalized adducts such as epoxide functionalized adducts reported in U.S. Pat. No. 3,842,010 since ene adducts maintain a site of olefinic unsaturation and are characterized by an olefin to olefin i.e. carbon to carbon bond formation.

The invention in its broader aspect is not limited to the specific details shown and described and departures may be made from such details without departing from the principles of the invention and without sacrificing its chief advantages.

What is claimed is:

1. Hydrolyzed oil soluble ene adduct of a $C_3$ to $C_{24}$ ethylenically unsaturated nitrogen-containing reactant having at least one electron withdrawing group and a copolymer of ethylene, at least one $C_3$ to $C_{50}$ alpha-monoolefin and at least one $C_5$ to $C_{24}$ non-conjugated diene, said hydrolyzed ene adduct containing carboxylate groups in molar concentration ranging up to about the molar concentration of said reactant and having a number average molecular weight of from about 1,000 to about 500,000.

2. An oil-soluble amide suitable as a lubricating oil sludge dispersing additive, of a hydrolyzed ene adduct of a $C_3$ to $C_{24}$ ethylenically unsaturated nitrogen-containing reactant having at least one electron withdrawing group and a copolymer of ethylene, at least one $C_3$ to $C_{50}$ alpha-monoolefin and at least one $C_5$ to $C_{24}$ non-conjugated diene, said amide containing from about 0.005 to about 0.8% by weight nitrogen and having a number average molecular weight of from about 1,000 to about 200,000.

3. The hydrolyzed ene adduct of claim 1, wherein said nitrogen-containing reactant is acrylonitrile.

4. An oil soluble amide of claim 2, wherein said $C_3$ to $C_{24}$ ethylenically unsaturated nitrogen-containing reactant is acrylonitrile; wherein said copolymer comprises about 30 to 85 mole % ethylene, about 15 to 70 mole % $C_3$ to $C_8$ alpha monoolefin and about 2 to 15 mole % $C_5$ to $C_{24}$ non-conjugated diene, said copolymer having a molecular weight in the range of about 10,000 to about 200,000; and wherein said amide is formed by reacting said hydrolyzed ene adduct with a $C_1$ to $C_{18}$ amine.

5. An oil soluble amide according to claim 4, wherein said amine is an alkylene polyamine.

6. A lubricating oil composition comprising a major proportion of lubricating oil and in the range of about 0.1 to 10 wt. % of the oil soluble amide of claim 4.

7. A lubricating oil composition comprising a major proportion of lubricating oil and in the range of about 0.1 to 10 wt. % of the oil soluble amide of claim 5.